(12) United States Patent
Nagai (10) Patent No.: US 7,085,453 B2
(45) Date of Patent: Aug. 1, 2006

(54) OPTICAL FUNCTIONAL DEVICE AND OPTICAL MODULE

(75) Inventor: Shuichi Nagai, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 192 days.

(21) Appl. No.: 10/717,558

(22) Filed: Nov. 21, 2003

(65) Prior Publication Data

US 2004/0114872 A1    Jun. 17, 2004

(30) Foreign Application Priority Data

Nov. 25, 2002  (JP) .............................. 2002-340703

(51) Int. Cl.
*G02B 6/26* (2006.01)

(52) U.S. Cl. .............................. 385/50; 385/28; 385/48

(58) Field of Classification Search .................. 385/50, 385/28, 42, 43, 48
See application file for complete search history.

(56) References Cited

U.S. PATENT DOCUMENTS

| | | | | |
|---|---|---|---|---|
| 4,146,297 A | * | 3/1979 | Alferness et al. | 385/41 |
| 5,123,078 A | * | 6/1992 | Thomas | 385/130 |
| 5,845,025 A | * | 12/1998 | Garito et al. | 385/50 |
| 5,854,866 A | * | 12/1998 | Leonard | 385/39 |
| 6,122,416 A | * | 9/2000 | Ooba et al. | 385/16 |
| 6,144,780 A | * | 11/2000 | Marcuse et al. | 385/16 |
| 6,535,672 B1 | * | 3/2003 | Paiam | 385/50 |
| 6,724,968 B1 | * | 4/2004 | Lackritz et al. | 385/131 |

FOREIGN PATENT DOCUMENTS

JP        7-283485        10/1995

* cited by examiner

*Primary Examiner*—Michelle Connelly-Cushwa
(74) *Attorney, Agent, or Firm*—McDermott Will & Emery LLP (57) ABSTRACT

An inventive optical functional device includes: two optical waveguides having mutually different equivalent refractive indices; and a connection through which the two optical waveguides are connected along an optical axis. The two optical waveguides are provided as a first optical waveguide, and a second optical waveguide having an equivalent refractive index lower than that of the first optical waveguide, respectively. The connection, through which the first and second optical waveguides are connected along the optical axis, is formed by selectively enlarging the width of the second optical waveguide, and is allowed to function as a multimode interference waveguide. The connection allows multimode propagation of a light passing through the second optical waveguide, and allows the light to be coupled into the first optical waveguide.

3 Claims, 11 Drawing Sheets

Optical Isolator

FIG. 9B

Optical Circulator

OPTICAL FUNCTIONAL DEVICE AND OPTICAL MODULE

BACKGROUND OF THE INVENTION

The present invention relates to optical functional devices and optical modules. In particular, the present invention relates to optical functional devices for controlling optical propagation (e.g., optical isolators and optical circulators), and to optical modules including the devices.

In a high-speed optical communication system, a reflected feedback light might be generated from an end face of an optical component or optical functional device, for example. This reflected feedback light is undesirable because it causes instability in the oscillation of a light source such as a semiconductor laser, which results in characteristic degradation. Therefore, an optical isolator for blocking such a feedback light is an indispensable device when an optical functional device such as a semiconductor laser or optical amplifier is used.

On the other hand, in constructing a processing system for optical communication such as bi-directional optical communication, an optical circulator that can divert and extract a light in only one propagation direction is also indispensable. Optical isolator and optical circulator exhibit optical nonreciprocity in which their output intensity characteristics are varied depending on the propagation direction of light; thus, they are utilized in various fields. Accordingly, optical isolator and optical circulator are important optical functional devices.

Figure 9A:
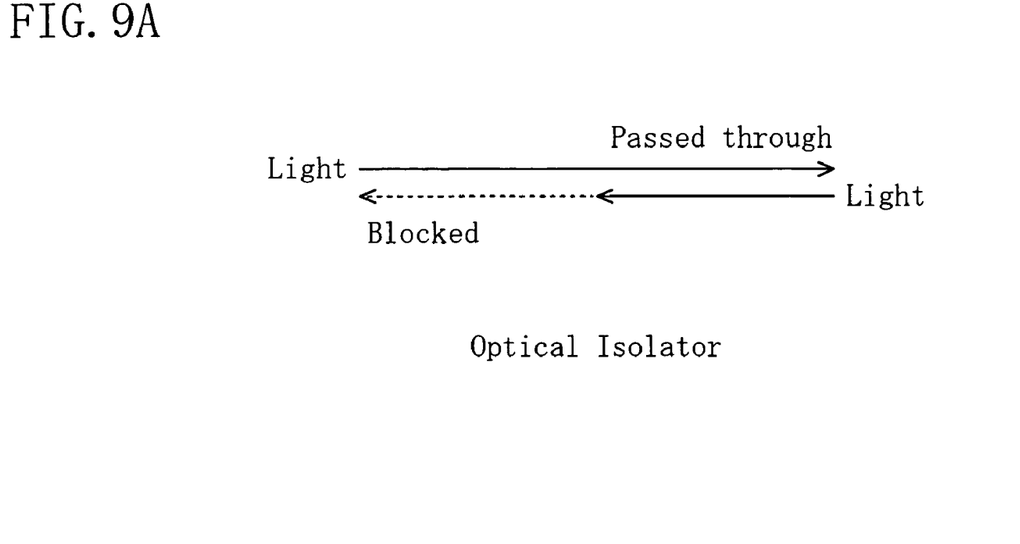
FIGS. 9A and 9B schematically illustrate the function of an optical isolator and that of an optical circulator, respectively.
Figure 9B:
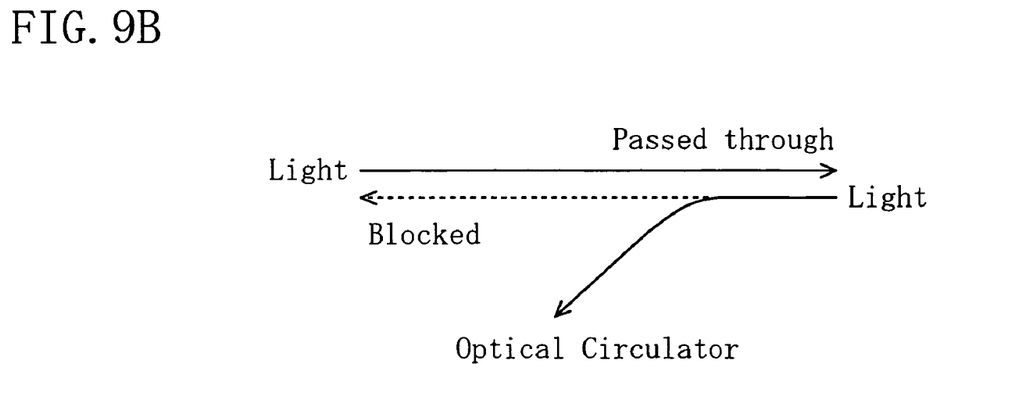

FIGS. 9A and 9B schematically illustrate the function of an optical isolator and that of an optical circulator, respectively. As shown in FIG. 9A, the optical isolator allows a light transmitted in one direction to pass through but blocks a light transmitted in the opposite direction. On the other hand, as shown in FIG. 9B, the optical circulator allows a light transmitted in one direction to pass through but blocks and deflects a light transmitted in the opposite direction.

Figure 10:
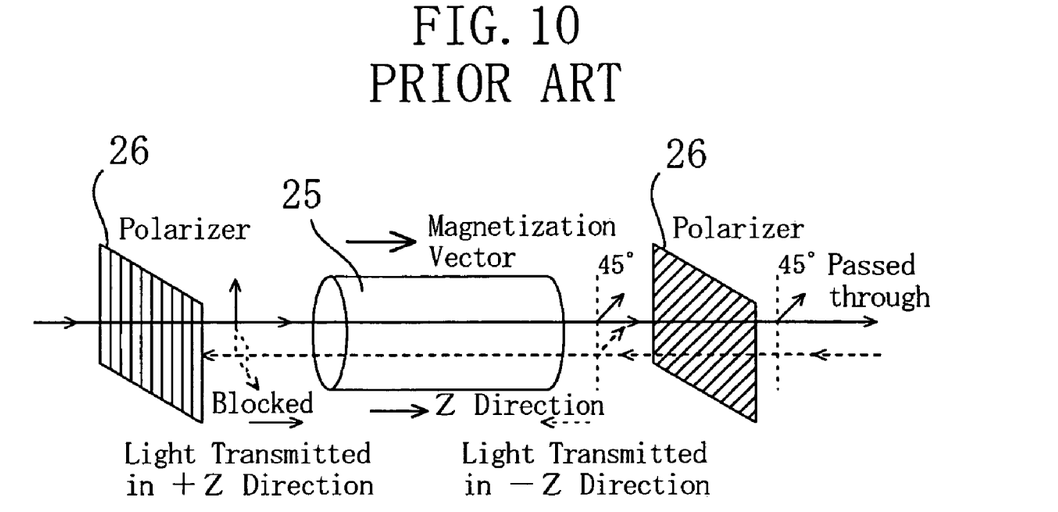
FIG. 10 illustrates the configuration of a conventional bulk-type optical isolator.

FIG. 10 illustrates the configuration of a bulk-type optical isolator having the function shown in FIG. 9A.

The bulk-type optical isolator that is generally used as a device exhibiting optical nonreciprocity (hereinafter called an "optical nonreciprocity device") includes: magnetized magnetic crystal 25 that enables the utilization of Faraday effect; and polarizers 26 that are used in combination with the magnetic crystal 25, thus allowing a light transmitted in one direction (i.e., a light transmitted in +Z direction) to pass through and blocking a light transmitted in the opposite direction (i.e., a light transmitted in −Z direction). Specifically, the polarization direction of a light incident on the magnetic crystal 25 (i.e., a Faraday rotator) is rotated 45° in accordance with the direction of magnetization, and thus the optical isolator exhibits optical nonreciprocity in which its output characteristic varies depending on the direction of the light incidence. A waveguide-type optical isolator is also provided based on the similar principle and is formed to include a magnetic material for utilizing magneto-optical effect, and polarizers used in combination with the magnetic material.

Figure 11:
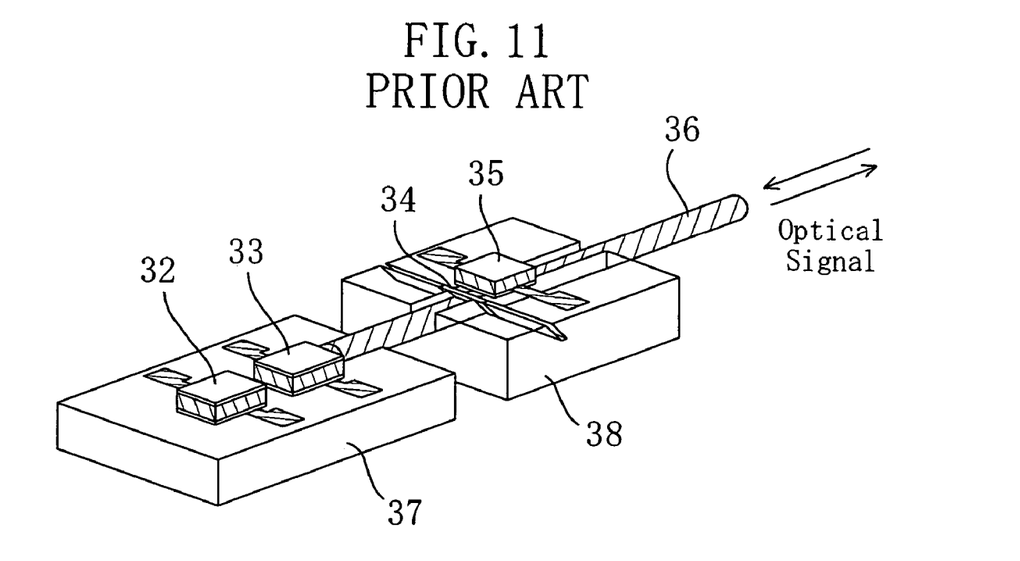
FIG. 11 is an oblique view illustrating the configuration of a conventional one fiber bi-directional optical module.

Next, FIG. 11 illustrates the configuration of a one fiber bi-directional optical module. The optical module illustrated in FIG. 11 includes an optical fiber 36, a silicon substrate 37 and a glass substrate 38. In the optical module, a photodiode for monitoring 32 and a semiconductor laser 33 are provided on the silicon substrate 37; on the other hand, a photodiode for reception 35 is provided on the glass substrate 38, and a wavelength-division filter 34 is inserted into the optical fiber 36.

In this optical module for optical communication, optical output intensity is important since it affects the quality of communication. Therefore, it is preferable that the number of components is decreased to provide a simple configuration and thus coupling loss is reduced. Furthermore, if a decrease in the number of components is enabled and thus a simple configuration can be provided, it becomes possible to achieve cost reduction in the optical module.

As for related application, reference may be made to Japanese Unexamined Patent Publication No. 7-283485 (see FIG. 3 in this publication) although it will be described later.

SUMMARY OF THE INVENTION

As described above, an optical nonreciprocity device such as an optical isolator utilizes magneto-optical effect to achieve optical nonreciprocity. However, a bulk-type optical nonreciprocity device that utilizes magneto-optical effect requires, for example, a Faraday rotator and/or an optical polarizer for controlling polarization of light, which increases the size of the device and/or makes it difficult to align the optical coupling between elements.

Further, an optical nonreciprocity device is used in combination with a waveguide-type optical functional device such as a semiconductor laser. However, in a bulk-type optical module, a lens or the like is required for optical coupling, and therefore, it is difficult to provide integration. Furthermore, since it is difficult to grow a magnetic material on a semiconductor substrate, it is impossible to provide monolithic/optical integration of a semiconductor optical functional device such as a semiconductor laser and an optical nonreciprocity device. As a result, it becomes impossible to form an optical module that is simple in structure and is compact in size.

Accordingly, significant advantages are obtained if a waveguide-type optical nonreciprocity device, which is compact so as to be integrated with a semiconductor laser or the like and is polarization-independent, is realized without using any polarizer and magnetic material. Although the waveguide-type optical isolators that can be coupled to an optical functional device without using any lens and that are suitable for integration are proposed, these waveguide-type optical isolators are also provided based on the principle similar to that of a bulk-type optical isolator and are complex in configuration; therefore, it is impossible to make the isolators compact in size.

A waveguide-type optical isolator that utilizes no magneto-optical effect is proposed in Japanese Unexamined Patent Publication No. 7-283485, for example. This optical isolator is illustrated in FIG. 12.

Figure 12:
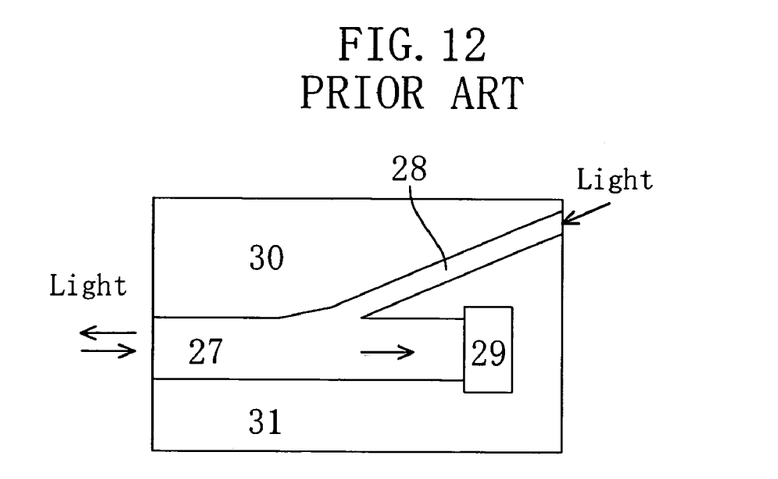
FIG. 12 is a plan view illustrating the structure of a conventional waveguide-type optical isolator.

The optical isolator illustrated in FIG. 12 includes: cladding regions 30 and 31 each having a low equivalent refractive index; optical waveguides 27 and 28 (through which a light is waveguided) each having a high equivalent refractive index; and a absorption layer 29 for absorbing a light waveguided thereto to reduce the intensity thereof. In this optical isolator, the cladding regions 30 and 31 are equal in equivalent refractive index.

Since a light that has entered the optical waveguide 27 is absorbed by the absorption layer 29, the light is not outputted through the optical waveguide 28. On the other hand, a light that has entered the optical waveguide 28 is outputted through the optical waveguide 27. This optical isolator exhibits optical nonreciprocity because a light is propagated only from the optical waveguide 28 to the optical waveguide 27, and a light coming through the waveguide 27 is divided into two portions: one going to the absorption layer 29 and another going to the optical waveguide 28 branched from the optical waveguide 27.

However, the optical isolator illustrated in FIG. 12 presents various problems. For example, this optical isolator has a poor characteristic and a large size, and the waveguide thereof has an incident angle which makes it difficult to provide optical coupling. The poor characteristic of the optical isolator will be described in more detail. Since the optical isolator illustrated in FIG. 12 has a structure in which the optical waveguides 27 and 28 that are branched to form a Y-shape is connected to a light absorption portion (i.e., the absorption layer 29), a light inputted from the waveguide 27 is propagated not only to the absorption portion but also to a narrow waveguide (i.e., the waveguide 28), resulting in an increase in feedback light. In other words, the efficiency of blocking a light which can be evaluated as an optical isolation ratio is low, meaning that the characteristic of the optical isolator is poor.

On the other hand, if the optical isolator illustrated in FIG. 12 is used in the one fiber bi-directional optical module for wide-band optical communication which is illustrated in FIG. 11, not only a feedback light, which is a signal light to be transmitted, but also a signal light to be received are blocked, and therefore, the optical isolator must be inserted between the wavelength-division filter 34 for extraction of a received light and the semiconductor laser 33 for signals. However, such a configuration increases the number of elements, optical loss in the optical coupling between the elements, the difficulty of the coupling, and the size and cost of the optical module.

In view of the above-described problems, the main object of the present invention is to provide an optical functional device and an optical module which enable optical integration and cost reduction.

A first inventive optical functional device includes: two optical waveguides having mutually different equivalent refractive indices; and a connection through which the two optical waveguides are connected along an optical axis.

A second inventive optical functional device includes: a first optical waveguide; a second optical waveguide having an equivalent refractive index lower than that of the first optical waveguide; and a connection through which the first and second optical waveguides are connected along an optical axis and which functions as a multimode interference waveguide.

In one preferred embodiment, the connection preferably allows multimode propagation of a light passing through the second optical waveguide, and preferably allows the light to be coupled into the first optical waveguide.

In another preferred embodiment, the first optical waveguide preferably allows single mode propagation of a light passing therethrough.

In still another preferred embodiment, the equivalent refractive index of the connection is preferably changed in succession or in steps along the optical axis.

In yet another preferred embodiment, the equivalent refractive index of the connection is preferably changed in succession or in steps along a direction approximately perpendicular to the optical axis.

A third inventive optical functional device includes: two optical waveguides having mutually different refractive indices; and a connection through which the two optical waveguides are connected, wherein single mode propagation of a light incident on one of the optical waveguides, having a high refractive index, is allowed through the one of the optical waveguides, and wherein multimode propagation of a light incident on the other optical waveguide having a low refractive index is allowed through the other optical waveguide and the connection, thus realizing optical non-reciprocity.

A fourth inventive optical functional device includes: a first optical waveguide; a second optical waveguide having an equivalent refractive index lower than that of the first optical waveguide; and a connection through which the first and second optical waveguides are connected along an optical axis, wherein the connection is formed by selectively enlarging the waveguide width of the second optical waveguide.

In one preferred embodiment, the first and second optical waveguides are each preferably provided as a planar lightwave circuit, and the first and second optical waveguides are preferably horizontally arranged.

In another preferred embodiment, the first and second optical waveguides are each preferably provided as a planar lightwave circuit, and the second optical waveguide may be located over the first optical waveguide, or the first optical waveguide may be located over the second optical waveguide.

In still another preferred embodiment, the first and second optical waveguides each preferably include a core and cladding, and a difference between the equivalent refractive index of the first optical waveguide and that of the second optical waveguide is preferably determined by the cladding.

In yet another preferred embodiment, the cladding of the first optical waveguide and that of the second optical waveguide are made of the same material, and the difference between the equivalent refractive indices is determined by a difference between the thickness of the cladding of the first optical waveguide and that of the cladding of the second optical waveguide.

In another preferred embodiment, the inventive optical functional device has at least one of the functions of an optical isolator, an optical circulator and a mode converter.

An inventive optical module includes: an optical functional device functioning as at least one of an optical isolator and an optical circulator; a laser element; and a light-receiving element, wherein the optical functional device is preferably one of the above-described first through fourth inventive optical functional devices.

DESCRIPTION OF THE PREFERRED EMBODIMENTS

The present inventors eagerly conducted various studies in order to develop an optical functional device that can be integrated with a semiconductor optical functional device or the like, that is small in size, and that can be used as a waveguide-type optical circulator. As a result, we succeeded in realizing an optical functional device that exhibits optical nonreciprocity by utilizing an equivalent refractive index distribution instead of utilizing magneto-optical effect, and thus we achieved the present invention. Besides, we found that if this optical functional device is used in an optical module for optical communication, the module can be simplified, provided at low cost, and compact in size.

Hereinafter, embodiments of the present invention will be described with reference to the accompanying drawings. In the drawings, the constituting elements that are substantially identical in function are identified by the same reference characters. Furthermore, the present invention is not limited to the following embodiments.

FIRST EMBODIMENT

Figure 1A:
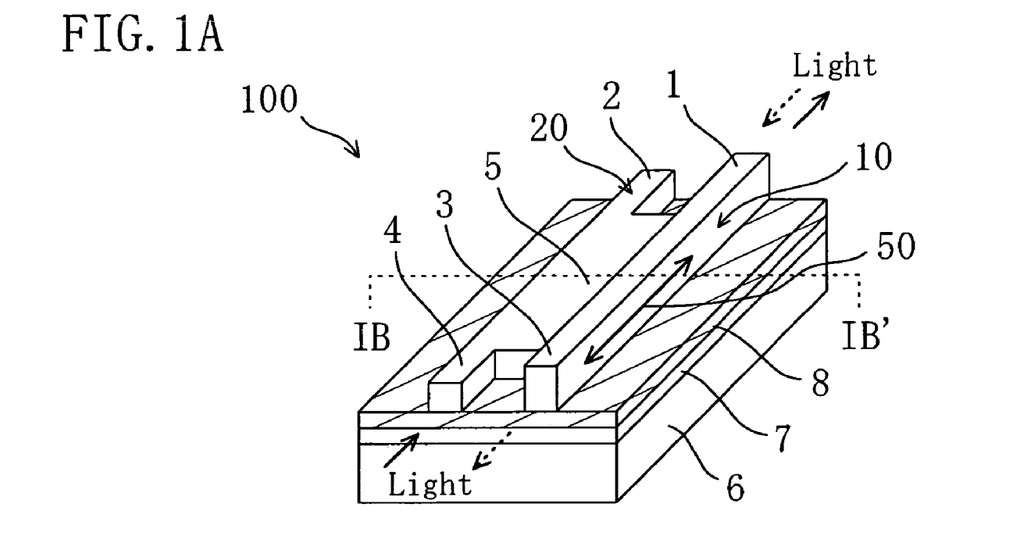
FIG. 1A is an oblique view schematically illustrating the structure of an optical functional device according to a first embodiment of the present invention.

An optical functional device according to a first embodiment of the present invention will be described with reference to FIGS. 1A and 1B. FIG. 1A is an oblique view schematically illustrating the structure of an optical functional device 100 of the present embodiment, and FIG. 2B is a cross-sectional view taken along the line IB–IB' shown in FIG. 1A.

Figure 1B:
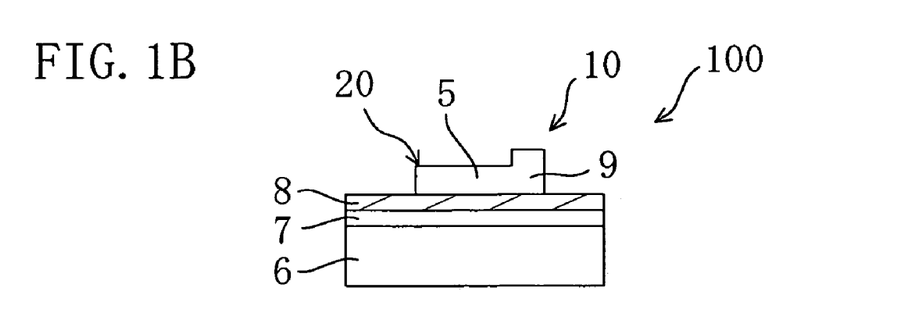
FIG. 1B is a cross-sectional view taken along the line IB–IB' shown in FIG. 1A.

The optical functional device 100 shown in FIGS. 1A and 1B includes: two optical waveguides (10 and 20) having mutually different equivalent refractive indices; and a connection 5 through which the two optical waveguides (10 and 20) are connected along an optical axis 50. One of the two optical waveguides will be hereinafter called a first optical waveguide 10 while the other will be hereinafter called a second optical waveguide 20, and the equivalent refractive index of the second optical waveguide 20 is lower than that of the first optical waveguide 10. It should be noted that input and output terminals of the first optical waveguide 10 (input and output waveguides) are identified by "1" and "3", and input and output terminals of the second optical waveguide 20 are identified by "2" and "4".

The connection 5, through which the first and second optical waveguides 10 and 20 are connected along the optical axis, is formed by selectively enlarging the width of the second optical waveguide 20, and is allowed to function as a multimode interference waveguide. This connection 5 allows multimode propagation of a light passing through the second optical waveguide 20, and allows the light to be coupled into the first optical waveguide 10. On the other hand, a light passing through the first optical waveguide 10 can be automatically propagated through the first optical waveguide 10, and can be prevented from being coupled into the second optical waveguide 20. In other words, a light from the terminal 1 is outputted to the terminal 3 but is not outputted to the terminal 4; on the other hand, a light from the terminal 4 can be outputted to the terminal 1 via the connection 5, and this light can be prevented from being outputted to the terminal 2.

Accordingly, the optical functional device 100 of the present embodiment exhibits optical nonreciprocity, and therefore, the optical functional device 100 can be used as an optical isolator, an optical circulator, and/or a mode converter.

Hereinafter, the structure of the optical functional device 100 of the present embodiment will be described in more detail. The optical functional device 100 shown in FIG. 1 includes: a substrate 6; a lower cladding layer 7; a core layer (waveguide layer) 8; and an upper cladding layer 9. The lower cladding layer 7, core layer 8, and upper cladding layer 9 are stacked in this order over the substrate 6, and thus the optical functional device 100 has a so-called "ridge-waveguide structure". Alternatively, the optical functional device 100 may have a high mesa structure in which the core layer 8 is removed except its region sandwiched between the upper and lower cladding layers 7 and 9. In the present embodiment, the substrate 6 is made of InP, the core layer 8 is made of InGaAsP, and the cladding layers 7 and 9 are each made of InP. Each of the first and second optical waveguides 10 and 20 is a planar lightwave circuit (PLC) formed over the substrate 6, and the first and second optical waveguides 10 and 20 are each made up of the lower cladding layer 7, core layer 8 and upper cladding layer 9. The first and second optical waveguides 10 and 20 are arranged in parallel with respect to the principal surface of the substrate 6. In other words, the first and second optical waveguides 10 and 20 are horizontally arranged.

As shown in FIGS. 1A and 1B, the thickness of the upper cladding layer 9 located on the core layer 8 is different between the first optical waveguide 10 and the second optical waveguide 20. Due to the difference in the thickness of the upper cladding layer 9, the first and second optical waveguides 10 and 20 can have mutually different equivalent refractive indices, and therefore, the equivalent refractive index distribution can be made unsymmetrical with respect to the optical axis 50 (i.e., the optical propagation direction).

The semiconductor multilayer structure shown in FIG. 1 can be formed by carrying out, for example, metal organic chemical vapor deposition (MOCVD), molecular beam epitaxy (MBE), and/or liquid phase epitaxy (LPE). Further, the difference in equivalent refractive index can be made by varying layer thickness, composition, material, dopant and carrier concentration, absorption coefficient, coefficient of light confinement, and/or optical polarization/wavelength dependence, for example. An equivalent refractive index refers to a value that represents the standardized relationship between a propagation constant, at which a light is propagated through an optical waveguide, and a wave number, and is also called an effective refractive index.

Figure 2A:
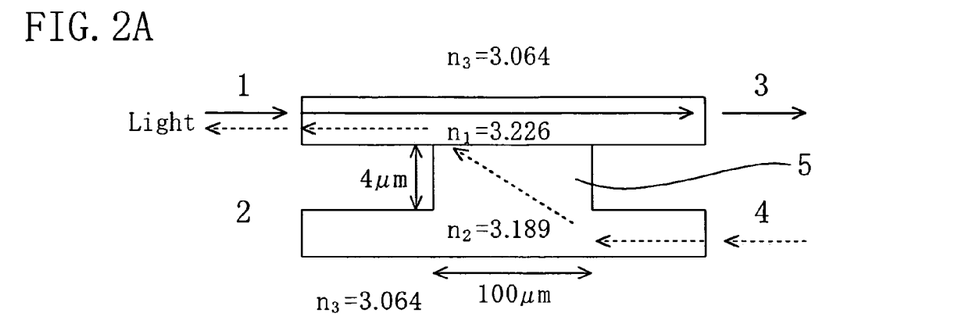
FIG. 2A is a plan view illustrating an equivalent refractive index distribution according to the first embodiment of the present invention.
Figure 2B:
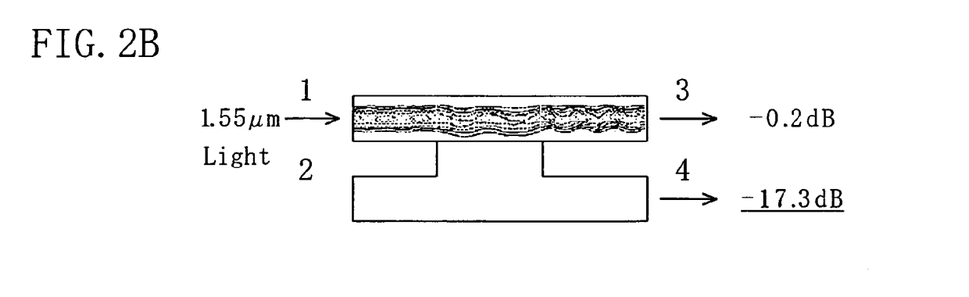
FIG. 2B illustrates the simulation result of propagation when a light has entered a terminal 1.
Figure 2C:
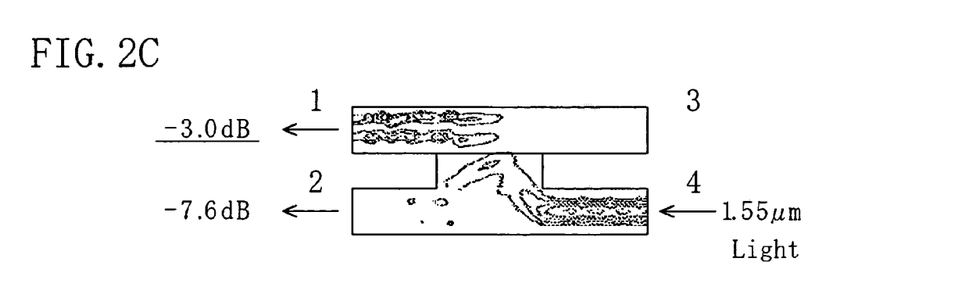
FIG. 2C illustrates the simulation result of propagation when a light has entered a terminal 4.

FIG. 2A is a plan view illustrating an equivalent refractive index distribution in the present embodiment, FIG. 2B illustrates the simulation result of propagation when a light has entered the terminal 1, and FIG. 3C illustrates the simulation result of propagation when a light has entered the terminal 4.

In FIG. 2A, $n_1$, $n_2$ and $n_3$ each represent an equivalent refractive index of each region where $n_1 > n_2 > n_3$. A multimode interference region, which constitutes the connection 5, is formed by selectively extending the width of the second optical waveguide 20 in a horizontal direction (i.e., in the direction approximately perpendicular to the optical axis 50). Accordingly, the equivalent refractive index of the multimode interference region, i.e., the connection 5, is similar to that of the second optical waveguide 20 and is thus represented by $n_2$.

In FIG. 2A, the equivalent refractive index $n_3$ of the cladding is 3.064, the equivalent refractive index $n_2$ of one of the two waveguides (each having a waveguide width of 2 μm) is 3.189, and the equivalent refractive index $n_1$ of the other waveguide is 3.226. In this embodiment, a TE wave having a wavelength of 1.55 μm is used for an incident light, and the overall length and overall width of the connection 5 (i.e., a connecting part through which the two waveguides are connected) are 100 μm and 8 μm, respectively. FIGS. 2B and 2C illustrate the results of analysis on the device characteristic obtained by the device structure having the equivalent refractive index distribution shown in FIG. 2A, which is carried out by a wide-angle finite difference beam propagation method.

Hereinafter, the principle on which the optical functional device 100 of the present embodiment exhibits optical nonreciprocity will be described with reference to FIG. 2B.

As shown in FIG. 2B, if a light is inputted to the input and output terminal 1, single mode propagation of the light is automatically allowed, and the light is outputted to the input and output terminal 3. This is because, even if the light, which is propagated from the input and output terminal 1, tries to enter the connection (multimode interference region) 5, the region through which the light is propagated has an equivalent refractive index higher than that of the other region. That is, the light inputted to the input and output terminal 1 does not leak into the other region, and thus single mode propagation of the light to the input and output terminal 3 is allowed with total reflection.

On the other hand, as shown in FIG. 2C, a light inputted to the input and output terminal 4 is outputted to the input and output terminal 1. This occurs because of the following reasons. Suppose that the light inputted to the input and output terminal 4 enters the connection (multimode interference region) 5. In that case, since the equivalent refractive index of the region 5 is lower than that of the other waveguide, multimode interference propagation of the light is allowed in the region including a region of the other waveguide having a higher equivalent refractive index, and as a consequence, the light is outputted from the input and output terminal 1. By utilizing the multimode interference propagation, the light can be efficiently extracted from the input and output terminal 1.

Therefore, if a comparison is made between an optical output at the input and output terminal 1 and an optical output at the input and output terminal 4, it can be seen that optical nonreciprocity is achieved in which the optical output varies depending on the optical propagation direction, thus allowing the optical functional device 100 to be used as an optical isolator. Furthermore, when a light has entered the input and output terminal 1, the blocked light can be extracted from the input and output terminal 3, and thus the optical functional device 100 is also allowed to function as a waveguide-type optical circulator that diverts the light in respective optical propagation directions.

Hereinafter, the examples illustrated in FIGS. 2B and 2C will be described once again. As shown in FIG. 2B, if a light has entered the input and output terminal 1, the light is confined within the region having the higher equivalent refractive index $n_1$, and is then outputted from the input and output terminal 3. On the other hand, if a light has entered the input and output terminal 4, multimode interference propagation of the light is allowed through the regions having the equivalent refractive indices $n_1$ and $n_2$, and then almost all of the light is outputted to the input and output terminal 1. Since the equivalent refractive indices are unsymmetrical with respect to the optical propagation direction, the distribution of optical output intensity becomes unsymmetrical depending on the input position, and there is an asymmetry between input direction and output direction. As shown in FIGS. 2B and 2C, the light propagated from the terminal 1 to the terminal 4 is attenuated to about 17 dB, whereas the light propagated in the opposite direction from the terminal 4 to the terminal 1 is attenuated to about 3 dB. Accordingly, it is confirmed that the device structure of the present embodiment can achieve optical nonreciprocity.

The output characteristic of a light propagated from the input and output terminal 1 to the input and output terminal 4 is dependent on the input optical wavelength, and therefore, it is possible to effectively utilize this wavelength dependence. Furthermore, since the light that has entered the input and output terminal 4 in zero-order mode is outputted from the input and output terminal 1 in first-order mode; thus, the optical functional device 100 has the function of carrying out mode conversion. Accordingly, due to the waveguide structure in the present embodiment, various mode conversions can be carried out.

Figure 3A:
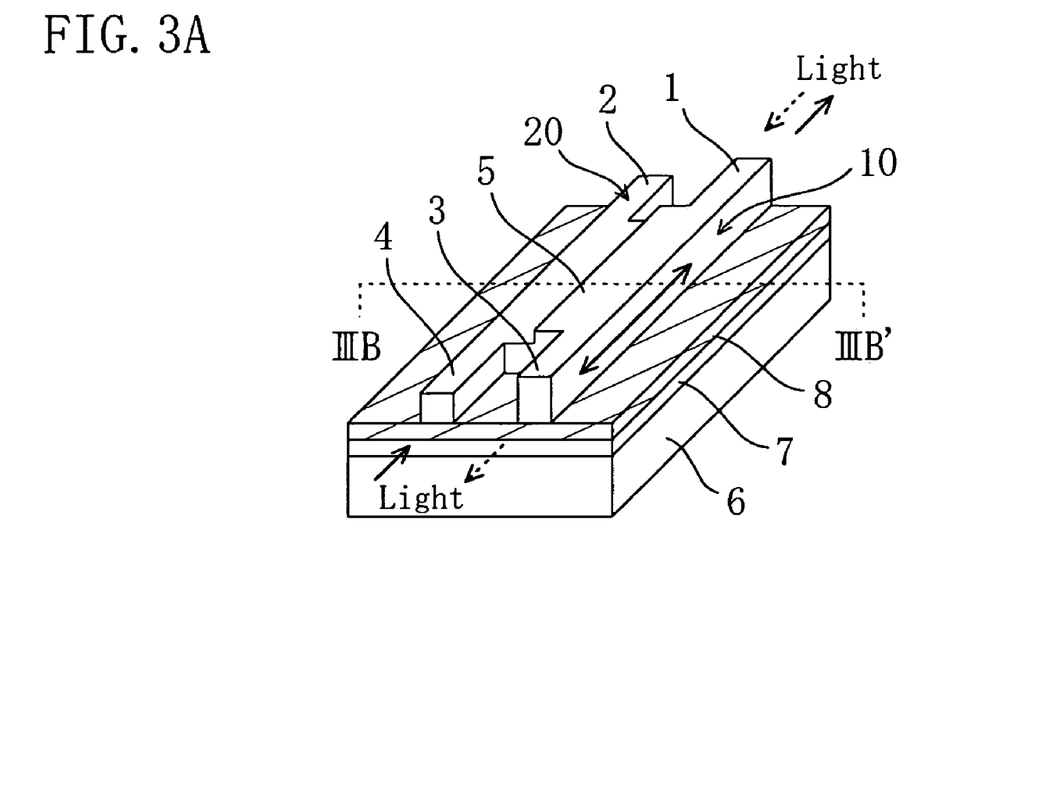
FIG. 3A is an oblique view schematically illustrating a multimode-interference-waveguide-type optical functional device for output in zero-order mode.
Figure 3B:
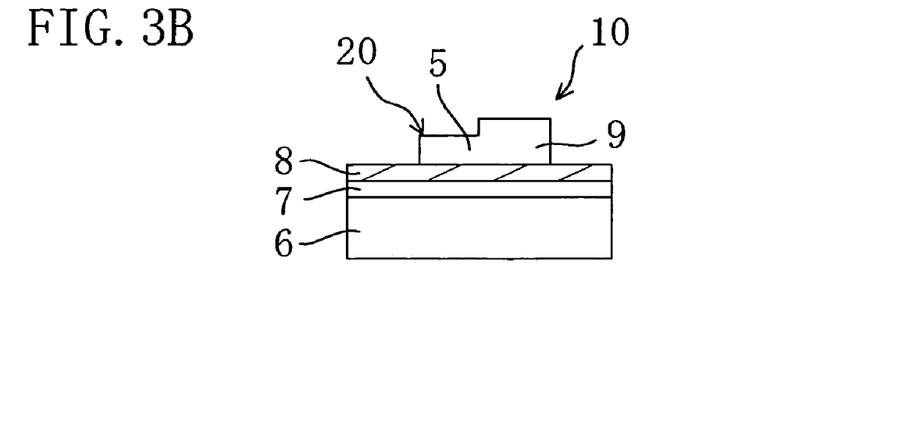
FIG. 3B is a cross-sectional view taken along the line III–IIIB' shown in FIG. 3A.

As shown in FIGS. 3A and 3B, by adopting an input and output waveguide structure in which a light in a mode other than a fundamental mode is blocked, it becomes possible to output a light in zero-order mode. In the structure shown in FIGS. 3A and 3B, the connection 5 is stepped. More specifically, the connection 5 is formed by partially enlarging not only the width of the second optical waveguide 20 but also the width of the first optical waveguide 10. By forming the connection 5 in this manner, higher-order modes (i.e., modes other than zero-order mode) cannot exist at the width of the first optical waveguide 10, and thus it becomes possible to output a light in zero-order mode. Besides, if a light is inputted to the terminal 4 in first-order mode, mode conversion is carried out, and thus it becomes possible to output the light from the terminal 1 in zero-order mode. This fact is confirmed in simulation.

The optical functional device of the present embodiment is formed by providing an unsymmetrical structure or a connection between the waveguides having unsymmetrical refractive indices, and is thus allowed to exhibit optical nonreciprocity. Therefore, as described above, the optical functional device of the present embodiment can also be used as an optical functional device having a function other than that of an optical isolator. The optical functional device 100 of the present embodiment is one that exhibits optical nonreciprocity by utilizing the equivalent refractive indices of the optical waveguide structure and/or the asymmetry of the structure in which the combination of input and output terminals may be a) 2 input terminals×2 output terminals, b) 1 input terminal×2 output terminals, or c) a plurality of input terminals×a plurality of output terminals.

Although the present embodiment has been described on the supposition that the optical waveguides are connected via the multimode interference waveguide, the optical waveguides may be connected via the other element (such as a directional coupler, or an optical coupler that uses a photonics crystal). In the present embodiment, the width and structure of each input and output terminal, the angle of incidence and the like may be adjusted. Even if the equivalent refractive indices and the widths of the waveguides are varied, the similar effects can be achieved.

Since the optical functional device of the present embodiment includes the two optical waveguides 10 and 20, which have mutually different equivalent refractive indices, and the connection 5, it becomes possible to provide optical integration and cost reduction. Specifically, in the present embodiment, it is possible to realize an optical-waveguide-type optical nonreciprocity device that is compact in size and can be integrated with a semiconductor laser, for example, without using any polarizer and magnetic material. Therefore, the optical functional device of the present embodiment is suitable for integration. Furthermore, since components such as a polarizer and a magnetic material are unnecessary, cost reduction can be achieved. Besides, since the device has a simple structure, it is suitable for downsizing.

Although the present embodiment has been described on the supposition that the optical waveguides are horizontally arranged, the optical waveguides may be vertically stacked. Even in such a case, the optical functional device exhibiting optical nonreciprocity can be formed. The structure in which the optical waveguides are stacked in this way is shown in FIGS. 4A and 4B.

Figure 4A:
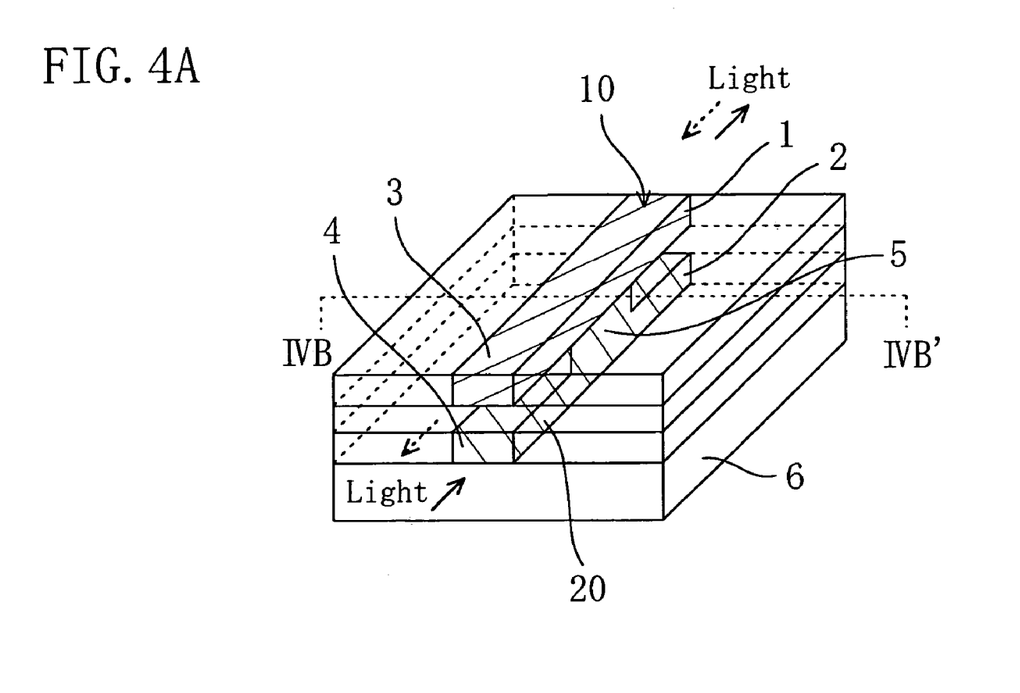
FIG. 4A is an oblique view schematically illustrating the structure of a multimode-interference-waveguide-type optical functional device having a stacked structure according to the first embodiment of the present embodiment.
Figure 4B:
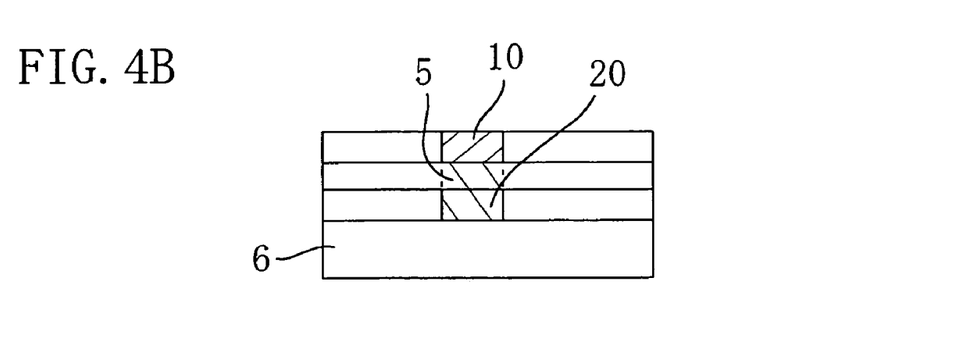
FIG. 4B is a cross-sectional view taken along the line IVB–IVB' shown in FIG. 4A.

In the optical functional device shown in FIGS. 4A and 4B, the first optical waveguide 10 is located over the second optical waveguide 20, and the first and second optical waveguides 10 and 20 are connected to each other via the connection 5. Naturally, the positions of the first and second optical waveguides 10 and 20 may be inverted so that the second optical waveguide 20 is located over the first optical waveguide 10.

Figure 5A:
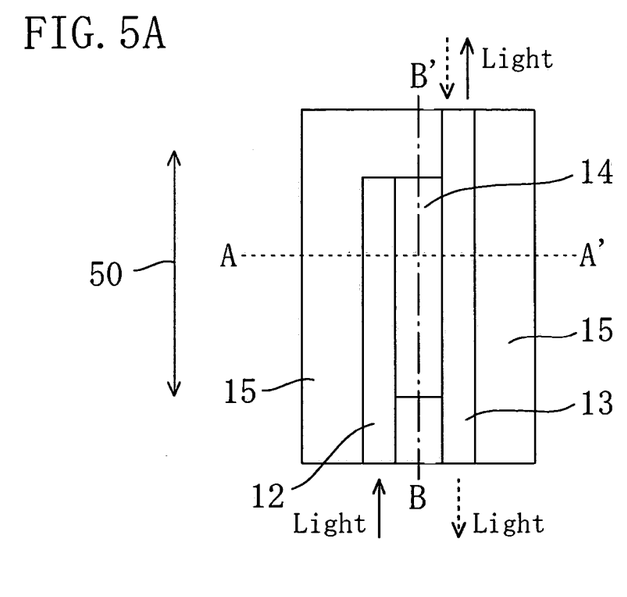
FIG. 5A is a top view schematically illustrating the structure of an unsymmetrical-waveguide-type optical functional device according to the first embodiment of the present invention.
Figure 5B:
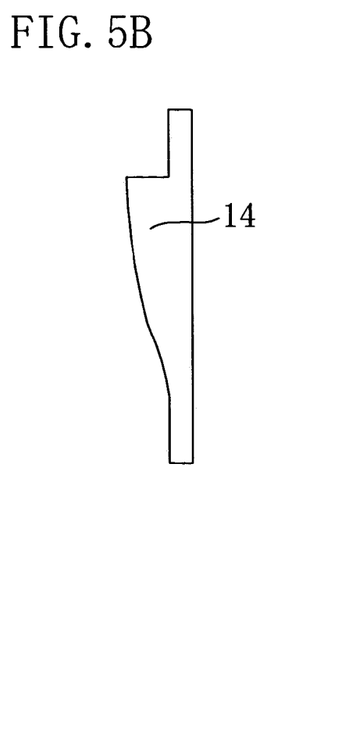
FIG. 5B is a cross-sectional view, which is taken along the line B–B' shown in FIG. 5A, for illustrating an equivalent refractive index distribution.
Figure 5C:
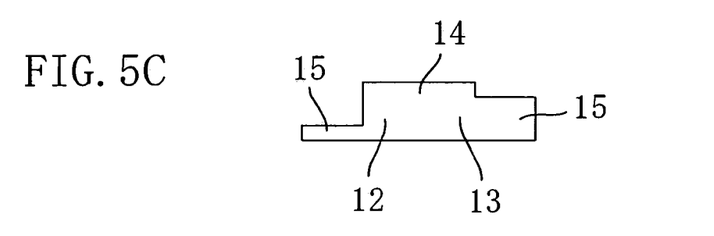
FIGS. 5C through 5E are cross-sectional views, each taken along the line A–A' shown in FIG. 5A, for illustrating the equivalent refractive index distribution.
Figure 5D:
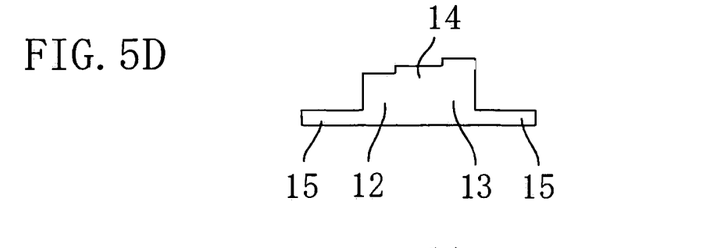
Figure 5E:
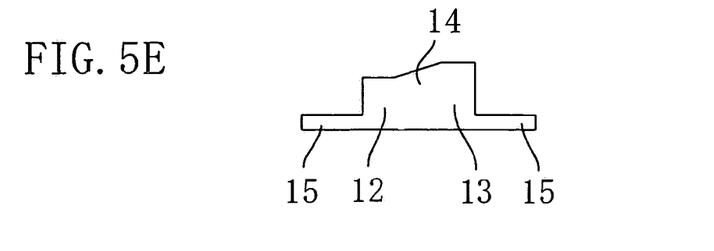

Even if the optical waveguides are arranged horizontally or vertically, the equivalent refractive index of the connection 5 can be changed in succession or in steps. FIG. 5B illustrates the case where the equivalent refractive index of the connection is changed in succession along the optical axis 50, and FIGS. 5C through 5E illustrate the cases where the equivalent refractive index of the connection is changed in succession or in steps along the direction perpendicular to the optical axis 50 (horizontal direction).

That is, FIG. 5 illustrates the refractive index distribution of a multimode-interference-waveguide-type optical functional device in various forms. If the equivalent refractive index of the connection is changed in succession or in steps, its boundary is blurred, and optical propagation can be smoothly modified without causing loss. It should be noted that FIG. 5B is a cross-sectional view taken along the line B–B' shown in FIG. 5A, and FIGS. 5C through 5E are cross-sectional views each taken along the line A–A' shown in FIG. 5A. It should also be noted that in FIG. 5, "12" and "13" each signify an input and output waveguide, "14" signifies a junction, and "15" signifies cladding regions.

As described above, FIG. 5B illustrates the case where the equivalent refractive index of the junction 14 is changed in succession along the optical propagation direction (i.e., the optical axis 50). FIG. 5C illustrates the case where the equivalent refractive indices of the cladding regions 15 located to the right and left of the junction 14 sandwiched between the waveguides 12 and 13 are different from each other (i.e., a waveguide-type optical circulator in which the waveguides have a uniform refractive index). As shown in FIG. 5C, even if the refractive index of the waveguide 12 and that of the waveguide 13 are equal to each other, the equivalent refractive indices of left-side and right-side waveguide portions become unsymmetrical as long as the refractive indices of the cladding regions located on the right and left of the waveguides are mutually different; therefore, the optical functional device exhibiting optical nonreciprocity can be formed. FIG. 5D illustrates the case where the equivalent refractive index of the junction 14 is changed in steps, while FIG. 5E illustrates the case where the equivalent refractive index of the junction 14 is changed in succession.

SECOND EMBODIMENT

Hereinafter, an exemplary method for fabricating an optical functional device according to a second embodiment of the present invention will be described with reference to FIGS. 6 and 7. In the fabrication method according to the present embodiment, a semiconductor stacked structure is formed on a substrate, and then the semiconductor stacked structure is etched, thereby obtaining an optical functional device according to the second embodiment of the present invention.

Figure 6A:
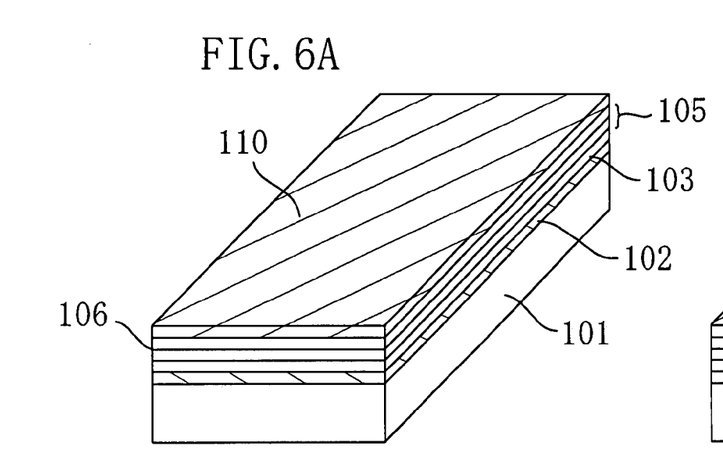
FIGS. 6A through 6E are oblique views for illustrating an exemplary method for fabricating an optical functional device according to a second embodiment of the present invention.

First, as shown in FIG. 6A, an InGaAsP waveguide layer 102, an InP cladding layer 103, an InGaAsP cap layer 105, and an $SiO_2$ layer 110 are stacked in this order over an InP substrate 101. The InGaAsP cap layer 105 includes an InP etching stop layer 106, and has a three-layer structure made up of upper and lower InGaAsP layers and the InP etching stop layer 106 sandwiched therebetween.

Figure 6B:
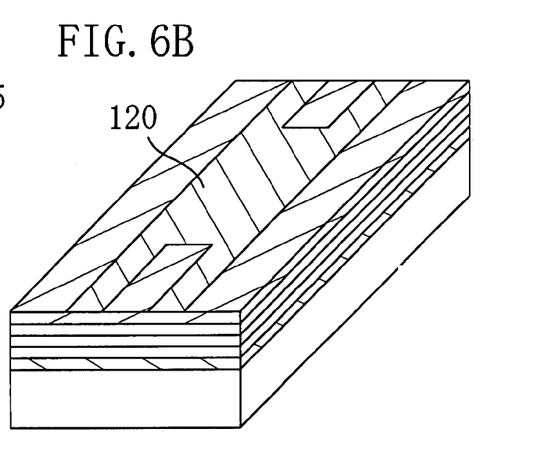

Next, as shown in FIG. 6B, a resist is applied to the $SiO_2$ layer 110 and is then patterned into a predetermined shape, thereby forming a resist pattern 120. The resist pattern 120 has an H-shape that defines a first optical waveguide, a second optical waveguide and a connection located therebetween.

Figures 6C, 6D, 6E:
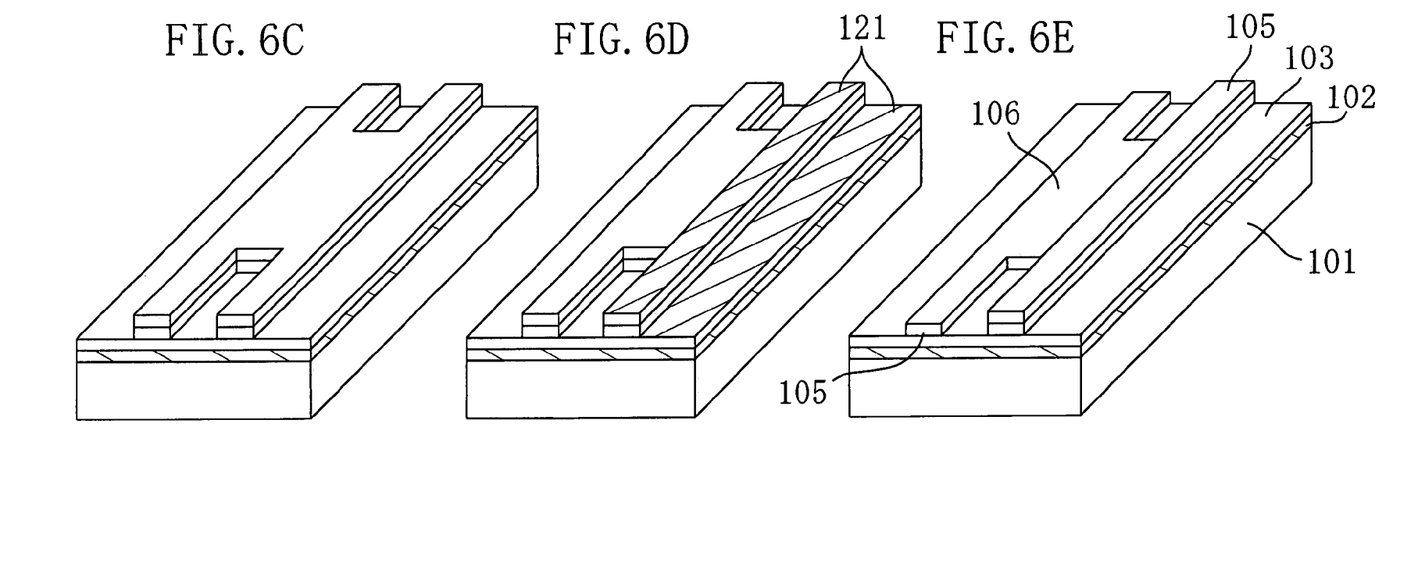

Subsequently, as shown in FIG. 6C, an etching process is performed using the resist pattern 120 as a mask to selectively remove the $SiO_2$ layer 110, the upper layer of the InGaAsP cap layer 105, the InP etching stop layer 106 and the lower layer of the InGaAsP cap layer 105, and then the resist pattern 120 is removed.

Thereafter, as shown in FIG. 6D, another resist is applied, and then the resist is patterned so that one of the optical waveguides is covered while the other waveguide and the connection are exposed, thus forming another resist pattern 121.

Finally, as shown in FIG. 6E, the upper layer of the InGaAsP cap layer 105 located at the exposed optical waveguide and connection is etched by using the resist pattern 121 as a mask and by utilizing the etching stop layer 106 so that the upper layer of the InGaAsP cap layer 105 is selectively removed, and then the resist pattern 121 is removed, thus obtaining the optical functional device according to the present embodiment.

In the optical functional device obtained by the above-described fabrication method (see FIG. 6E), the InP substrate 101 functions as lower cladding, and the InP cladding layer 103 and the InGaAsP cap layer 105 function as upper cladding for making a difference in equivalent refractive index. In other words, in the fabrication method illustrated in FIGS. 6A through 6E, a semiconductor stacked structure made up of a lower cladding layer, a core layer (waveguide layer), and an upper cladding layer including an etching stop layer is prepared, and then a resist pattern having a shape that defines the first and second optical waveguides and the connection is formed on the surface (upper surface) of the semiconductor stacked structure. Subsequently, an etching process is performed using the resist pattern as a mask so as to form the two optical waveguides and the connection. Thereafter, one of the optical waveguides and the connection (or only one of the waveguides) are etched, thus obtaining the optical functional device provided with the optical waveguides' having mutually different equivalent refractive indices, and the connection through which both the waveguides are connected.

Hereinafter, another exemplary method for fabricating an optical functional device according to the second embodiment of the present invention will be described with reference to FIGS. 7A through 7E.

Figure 7A:
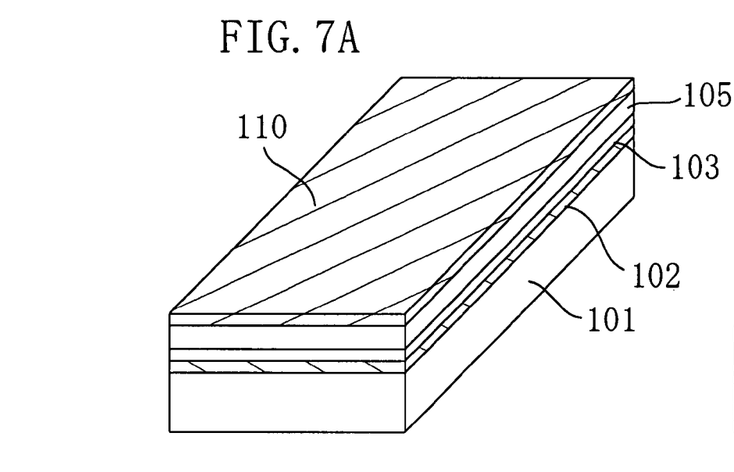
FIGS. 7A through 7E are oblique views for illustrating another exemplary method for fabricating an optical functional device according to the second embodiment of the present invention.

First, as shown in FIG. 7A, an InGaAsP waveguide layer 102, an InP cladding layer 103, an InGaAsP cap layer 105 and an SiO$_2$ layer 110 are stacked in this order over an InP substrate 101, thereby preparing a semiconductor stacked structure. The stacked structure shown in FIG. 7A is different from the stacked structure shown in FIG. 6A in that the InGaAsP cap layer 105 includes no etching stop layer.

Figure 7B:
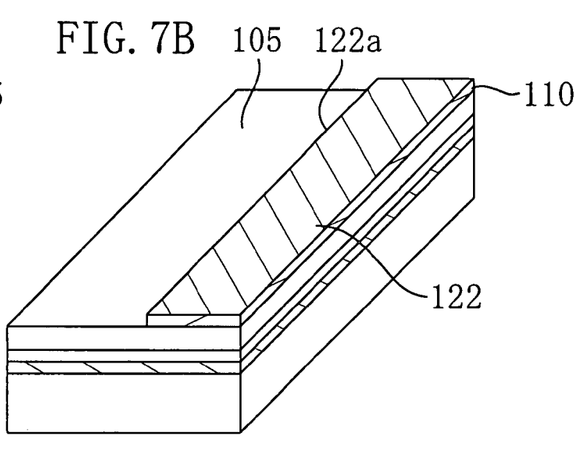

Then, as shown in FIG. 7B, a resist pattern 122 is provided on a predetermined region of the SiO$_2$ layer 110 to etch away a portion of the SiO$_2$ layer 110 which is not covered with the resist pattern 122. The resist pattern 122 is formed by applying a resist to the upper surface of the semiconductor stacked structure and by subsequently patterning the resist into a predetermined shape. It is to be noted that an end face 122a of the resist pattern 122 defines a longitudinally extending end face of one of two optical waveguides (more specifically, an end face of one of two optical waveguides opposite to an end face of the other waveguide).

Figures 7C, 7D, 7E:
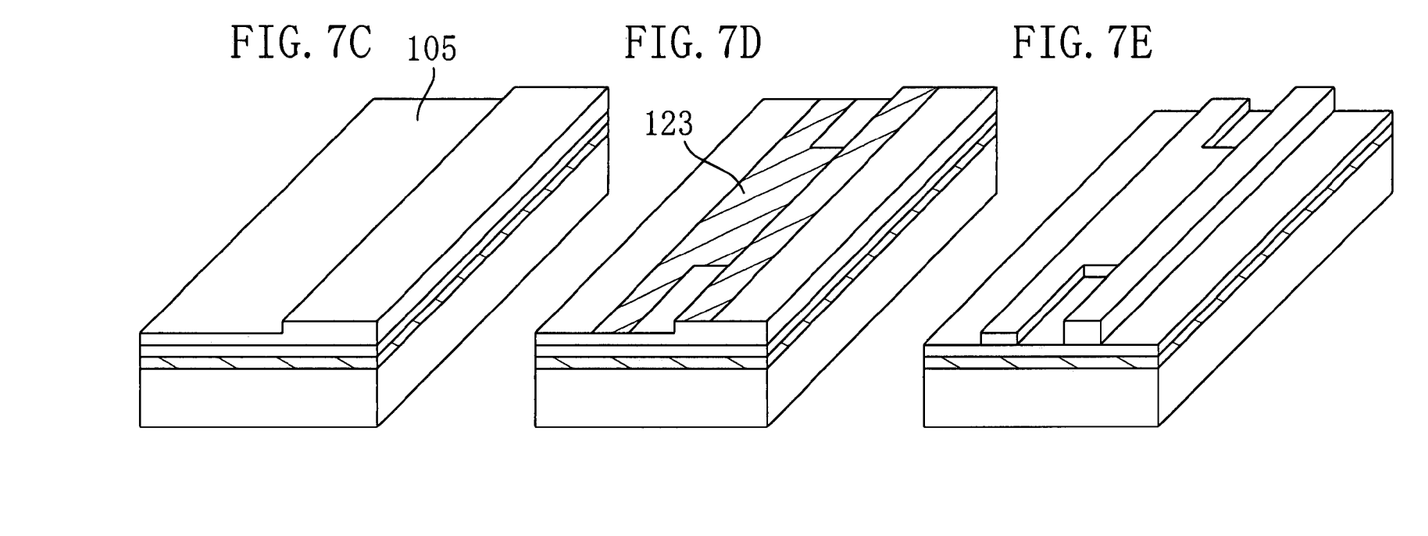

Next, as shown in FIG. 7C, the SiO$_2$ layer 110 is etched and the InGaAsP cap layer 105 is partially etched, thus obtaining the InGaAsP cap layer 105 having a step defined by the end face 122a of the resist pattern 122. Then, the resist pattern 122 and the SiO$_2$ layer 110 are removed.

Thereafter, as shown in FIG. 7D, another resist pattern 123 is provided over InGaAsP cap layer 105. The resist pattern 123 has a shape that defines first and second optical waveguides and a connection located therebetween, and is formed by applying a resist to the InGaAsP cap layer 105 and by subsequently patterning the resist into a predetermined shape.

Finally, as shown in FIG. 7E, the InGaAsP cap layer 105 is etched away using the resist pattern 123 as a mask, thus obtaining the optical functional device that is provided with the optical waveguides having mutually different equivalent refractive indices, and the connection through which both the optical waveguides are connected.

OTHER EMBODIMENTS

Although PLC optical waveguides have been described in each of the foregoing embodiments, the similar effects can be obtained even if an optical fiber is used. However, from the standpoint of providing optical integration or downsizing, it is preferable to use the PLC optical waveguides. As already described above, the present invention is applicable to any optical waveguide structure such as a ridge-waveguide structure or a high mesa structure.

Further, each of the embodiments has been described on the supposition that the optical waveguides are made of InGaAsP/InP materials. Alternatively, the other semiconductor material such as GaAs/AlGaAs or GaN, lithium niobate, organic material, dielectric material such as glass, or a combination of different materials may be used.

The optical functional device in each of the foregoing embodiments has been simply described as a passive device. However, by modulating the equivalent refractive indices to vary the asymmetry or by introducing an optical amplification/attenuation mechanism, the inventive optical functional device can be used as an optical active device such as an optical modulator having the function of an optical circulator, a tunable filter or an optical switch. This can be achieved by providing a structure in which gain or equivalent refractive indices are controlled by current injection, for example. Furthermore, by adopting a structure in which a light is partially attenuated and/or amplified, or optical phase is controlled at a connecting part of the optical waveguides or at a region other than the connecting part, it becomes possible to more effectively divert a light or to control output characteristic.

Figure 8A:
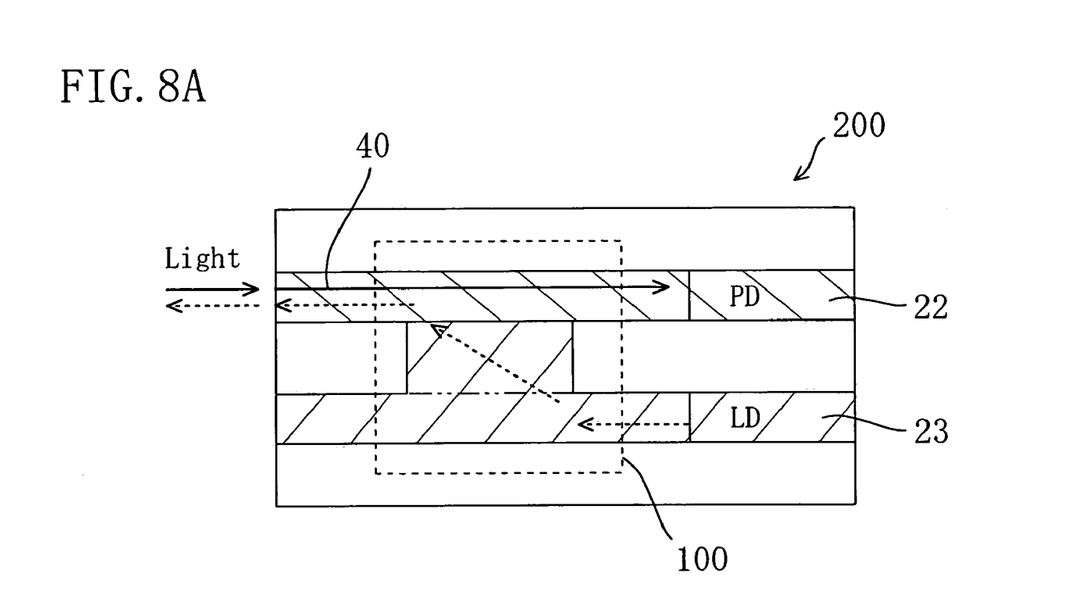
FIG. 8A is a plan view schematically illustrating the configuration of an optical module in which a waveguide-type optical circulator according to the second embodiment of the present invention is used.
Figure 8B:
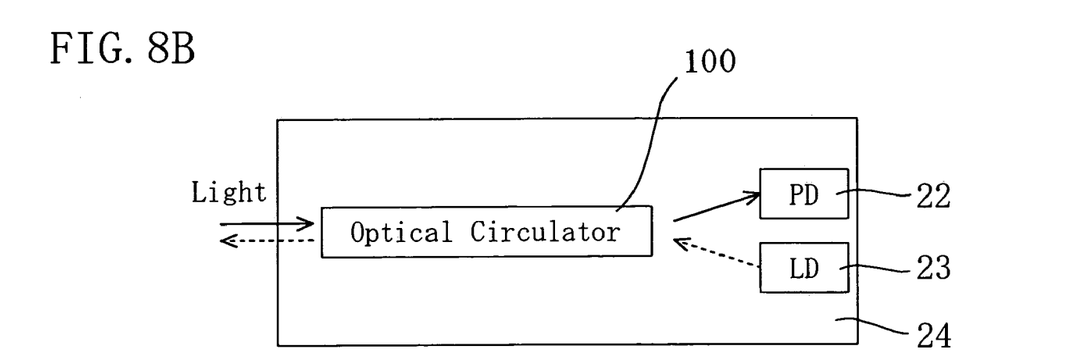
FIG. 8B illustrates the configuration shown in FIG. 8A under the concept of a one fiber bi-directional optical module.

The configuration of an optical module 200 provided with the waveguide-type optical circulator 100 described in the embodiments of the present invention is shown in FIGS. 8A and 8B. It should be noted that FIG. 8B illustrates the configuration shown in FIG. 8A under the concept of a one fiber bi-directional optical module. In other words, FIG. 8A illustrates an integrated optical module in which the waveguide-type optical circulator is used, and FIG. 8B illustrates the configuration of an optical module for transmission and reception in which the optical circulator is used. It should be noted that "LD" and "PD" shown in FIG. 8 signify a laser element (e.g., a semiconductor laser) and a light-receiving element (e.g., a photodiode), respectively. Furthermore, in FIG. 8A, "40" signifies input and output waveguides, and the semiconductor laser and light-receiving element are directly connected to the input and output waveguides 40.

Since the optical module 200 is configured as shown in FIG. 8, the module 200 can have not only the function of blocking a reflected feedback light that degrades the characteristic of the semiconductor laser (LD) 23, which is a transmission light source, but also the function of a wavelength-division filter (see "34" in FIG. 11) which extracts a received optical signal. Consequently, it is possible to provide the optical module that is compact in size and is fabricated at low cost.

Although the one fiber bi-directional optical module 200 in which the waveguide-type optical circulator 100 is used has been described with reference to FIG. 8, the one fiber bi-directional optical module may also be simply configured in a similar manner even if an optical circulator other than the waveguide-type optical circulator is used. In the schematic diagram shown in FIG. 8B, optical coupling can be provided between associated elements via an optical fiber, an optical waveguide or uniform medium (e.g., air or space), and the functional efficiency can be improved even if an optical circulator other than the waveguide-type optical circulator is used in the optical module.

Furthermore, if all the elements are each made of a semiconductor material, the waveguide-type optical circulator 100, semiconductor laser 23 and semiconductor photodiode 22 can be integrated together, thus forming the optical module that is more simple, compact and inexpensive.

In the above-described configuration, the waveguide-type optical circulator or waveguide-type optical isolator may have an unsymmetrical structure at a connecting part in which the equivalent refractive indices of cladding regions located on the right and left of the waveguides are different from each other (in this case, the cladding regions have equivalent refractive indices different from those of the cladding regions 30 and 31 in FIG. 12). This is because if the refractive indices of the cladding regions are different from each other, an equivalent refractive index, i.e., an influence exerted upon a light, can be varied.

The principle of the inventive optical functional device is based on the following fact. In an optical waveguide or an optical fiber through which a light is propagated, the optical propagation and reflection characteristic from a region having a high equivalent refractive index to a region having a low equivalent refractive index are different from those from a region having a low equivalent refractive index to a region having a high equivalent refractive index.

Based on this principle, the waveguide-type optical functional device having optical nonreciprocity or mode conversion function can be provided by utilizing only a difference in equivalent refractive index or equivalent refractive index distribution without using any magnetic material and optical polarizer. Also in the other waveguide-type optical circulator such as one having a uniform refractive index, the confinement of light within the desired waveguide can be improved by joining waveguides having mutually different equivalent refractive indices or by making the refractive indices of both cladding regions unsymmetrical, and therefore, the improvement in the device characteristic can be expected.

As a device structure for optical nonreciprocity and mode conversion, there is one in which at least two optical fibers or optical waveguides having mutually different equivalent refractive indices or waveguide widths are connected or branched at a connecting part therebetween. Also, there is another structure in which the equivalent refractive indices of cladding regions located on the right and left of waveguides with a connecting part provided therebetween are different, or still another structure in which the connecting part serves as a multimode interference waveguide. In this structure, at least two input and output waveguides are provided, and in a multimode interference optical waveguide through which a light can be waveguided in a plurality of specific lateral modes, the structure or equivalent refractive indices are unsymmetrical with respect to the optical propagation direction. Furthermore, another structure may be provided in which the equivalent refractive index of the connecting part sandwiched between the optical waveguides is changed in succession or in steps along the optical propagation direction or along the direction perpendicular to the optical propagation direction, or still another structure may be provided in which the function of partially attenuating and/or amplifying a light or the function of varying optical phase is introduced.

The structure of an inventive optical functional device has one or more input waveguides and one or more output waveguides, and is characterized in that the equivalent refractive index distribution or the structure is unsymmetrical with respect to the direction perpendicular to the optical propagation direction. Therefore, the inventive optical functional device is one that exhibits optical nonreciprocity by utilizing the transfer of a light between input and output terminals. By providing an unsymmetrical structure in which two or more optical waveguides having mutually different equivalent refractive indices or structures are connected via a multimode interference region through which a light is propagated in a plurality of specific modes, it becomes possible to realize the waveguide-type optical functional device that exhibits optical nonreciprocity using only a difference in refractive index.

In one embodiment of the present invention, the equivalent refractive indices are made unsymmetrical at the waveguide connecting part in the waveguide-type optical isolator or waveguide-type optical circulator, through which the two or more optical waveguides are connected or joined to each other without using any magnetic material. Thus, the polarization of optical distribution is promoted to enhance the output to the desired waveguide, thereby improving the device characteristic. The waveguide-type optical isolator or waveguide-type optical circulator may have an unsymmetrical structure at the connecting part in which the equivalent refractive indices of the cladding regions on the right and left of the waveguides are different. In that case, the device characteristic can be similarly improved.

Moreover, the optical circulator 100 may be used in an optical module for optical communication which includes at least the semiconductor laser 23 and light-receiving photodiode 22. In such a case, a feedback light is blocked, and in addition, the wavelength-division filter 34 for extracting a received signal light becomes unnecessary, thus making the optical module simple and compact. Furthermore, by using the waveguide-type optical circulator 100 that is not based on magneto-optical effect, associated optical components (optical functional devices) can be coupled without using any lens, thus achieving compactness. Besides, if these optical functional devices are each made of a semiconductor material, monolithic integration is enabled, thus achieving further compactness.

As described above, the inventive optical functional device does not utilizes the conventional principle of optical nonreciprocity based on magneto-optical effect, but utilizes an all-new principle, i.e., an unsymmetrical equivalent refractive index distribution. Therefore, it becomes possible to realize an optical nonreciprocity device having an optical waveguide structure that allows the device to be favorably coupled with the other optical functional device, and having a simple structure that makes the Faraday rotator 25 and polarizers 26 unnecessary. In addition, since the principle of the inventive optical functional device is only based on the equivalent refractive index distribution, the selection of materials is unnecessary, and it becomes possible to enable monolithic/optical integration of the device with the semiconductor laser 23 and light-receiving element 22 which can be provided at low cost. The inventive optical functional device has a plurality of output waveguides, and thus generation of a reflection light at the connecting part can be reduced or the reflection light can be utilized for extraction.

Since single mode propagation of a light to be diverted is allowed, the light can be efficiently diverted in the inventive optical functional device that serves as a novel waveguide-type optical circulator. For example, if the multimode interference waveguide structure 5 is used, the device can be compact in size, and polarization dependence and wavelength dependence can be reduced.

That is, the inventive optical functional device includes two optical fibers having mutually different equivalent refractive indices, and a connection through which the two optical fibers are connected along an optical axis. Thus, since the equivalent refractive indices are different between waveguides, the blocking effect can be increased as compared with the conventional waveguide-type optical isolator. Further, the two waveguides can be arranged in parallel, thus making it easy to provide the structure that simplifies a junction with the other elements and making the device compact in size. Furthermore, since coupling length is short and coupling efficiency is better, the optical functional device that is compact in size and has a favorable characteristic can be provided. In addition, at the joint surface of the waveguides, an angle of incidence due to multimode interference enables the improvement of the device characteristic.

The inventive optical functional device includes the multimode interference waveguide 5 having a waveguide width which allows the existence of a large number of specific modes, and since the optical functional device is polarization-independent, a polarization-independent optical isolator or optical circulator can be provided. Although the waveguide width of the multimode interference waveguide 5 in the present invention is constant, the waveguide width may be changed. If the refractive indices of the cladding regions located on both sides of the two optical waveguides are unsymmetrical, the equivalent refractive indices can also be unsymmetrical, thus promoting the polarization of optical distribution to enhance the output to the desired waveguide and improving the device characteristic.

Moreover, by using the optical isolator or the optical circulator 100 in an optical module, the module can have not only the function of blocking a reflected feedback light that degrades the characteristic of the semiconductor laser 23, which is a transmission light source, but also the function of the wavelength-division filter 34 for extracting a received optical signal, thus achieving simplification and compactness. Since no magnetic material is required, monolithic optical integration can be provided at low cost.

Although preferred examples of the present invention have been described so far, the description is not intended to limit the scope of the present invention, and various modifications may naturally be made.

Since the inventive optical functional device includes two optical waveguides having mutually different equivalent refractive indices, and a connection through which the two optical waveguides are connected along an optical axis, optical nonreciprocity is achieved, and as a result, it becomes possible to provide the optical functional device and optical module which enable optical integration and cost reduction.

What is claimed is:

1. An optical functional device comprising:
   a first optical waveguide;
   a second optical waveguide having an equivalent refractive index lower than that of the first optical waveguide; and
   a connection through which the first and second optical waveguides are connected along an optical axis,
   wherein the connection is formed by selectively enlarging the waveguide width of the second optical waveguide,
   wherein the first and second optical waveguides each include a core and cladding,
   wherein a difference between the equivalent refractive index of the first optical waveguide and that of the second optical waveguide is determined by the cladding,
   wherein the cladding of the first optical waveguide and that of the second optical waveguide are made of the same material, and
   wherein the difference between the equivalent refractive indices is determined by a difference between the thickness of the cladding of the first optical waveguide and that of the cladding of the second optical waveguide.

2. The optical functional device according to claim 1,
   wherein the first and second optical waveguides are each provided as a planar lightwave circuit, and
   wherein the first and second optical waveguides are horizontally arranged.

3. The optical functional device according to claim 1,
   wherein the first and second optical waveguides are each provided as a planar lightwave circuit, and
   wherein the second optical waveguide is located over the first optical waveguide, or the first optical waveguide is located over the second optical waveguide.

* * * * *